United States Patent [19]

Bishop

[11] Patent Number: 5,799,958
[45] Date of Patent: Sep. 1, 1998

[54] TOOL STORAGE AND TRANSPORT SYSTEM

[76] Inventor: Ryan S. Bishop, 3082 Shaughnessy Street, Port Coquitiam, British Columbia, Canada, V3B 4L1

[21] Appl. No.: 828,054

[22] Filed: Mar. 28, 1997

[51] Int. Cl.⁶ ................................................ B62B 1/00
[52] U.S. Cl. ................................ 280/47.26; 280/472.7
[58] Field of Search .................... 280/47.17, 47.19, 280/47.24, 47.26, 47.27, 47.28, 47.35, 651, 655, 652

[56] References Cited

U.S. PATENT DOCUMENTS 5,013,055  5/1991  Labrum .................................. 280/47.19
5,207,723  5/1993  Neutz, Sr. ............................. 280/47.26
5,378,005  1/1995  Norton ................................... 280/47.26

*Primary Examiner*—Richard M. Camby

[57] ABSTRACT

A new Tool Storage and Transport System for keeping and transporting tools and equipment for use in various locations. The inventive device includes a frame and interchangeable boxes and bins that mount on cross bars. The frame and cross bars further form a sealed air chamber for use in accepting and retaining pressurized air. Air fittings are provided on the frame for use with tools and equipment that require pressurized air.

16 Claims, 4 Drawing Sheets

TOOL STORAGE AND TRANSPORT SYSTEM

BACKGROUND OF THE INVENTION

1. Field of the Invention

The present invention relates to utility carts and more particularly pertains to a new Tool Storage and Transport System for keeping and transporting tools and equipment for use in various locations. A sealed air chamber is formed in a frame to accept and retain pressurized air for use with tools requiring pressurized air.

2. Description of the Prior Art

The use of utility carts is known in the prior art. More specifically, utility carts heretofore devised and utilized are known to consist basically of familiar, expected and obvious structural configurations, notwithstanding the myriad of designs encompassed by the crowded prior art which have been developed for the fulfillment of countless objectives and requirements.

Known prior art utility carts include U.S. Pat. No. 5,013,055; U.S. Pat. No. 4,457,527; U.S. Pat. No. 4,759,560; and U.S. Pat. No. 4,864,334.

While these devices fulfill their respective, particular objectives and requirements, the aforementioned patents do not disclose a new Tool Storage and Transport System. The inventive device includes a frame forming a sealed air chamber and interchangeable boxes and bins that mount thereon.

In these respects, the Tool Storage and Transport System according to the present invention substantially departs from the conventional concepts and designs of the prior art, and in so doing provides an apparatus primarily developed for the purpose of keeping and transporting tools and equipment for use in various locations.

SUMMARY OF THE INVENTION

In view of the foregoing disadvantages inherent in the known types of utility carts now present in the prior art, the present invention provides a new Tool Storage and Transport System construction wherein the same can be utilized for keeping and transporting tools and equipment for use in various locations.

The general purpose of the present invention, which will be described subsequently in greater detail, is to provide a new Tool Storage and Transport System apparatus and method which has many of the advantages of the utility carts mentioned heretofore and many novel features that result in a new Tool Storage and Transport System which is not anticipated, rendered obvious, suggested, or even implied by any of the prior art utility carts, either alone or in any combination thereof.

To attain this, the present invention generally comprises a frame forming a sealed air chamber and interchangeable boxes and bins that mount thereon.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Tool Storage and Transport System apparatus and method which has many of the advantages of the utility carts mentioned heretofore and many novel features that result in a new Tool Storage and Transport System which is not anticipated, rendered obvious, suggested, or even implied by any of the prior art utility carts, either alone or in any combination thereof.

It is another object of the present invention to provide a new Tool Storage and Transport System which may be easily and efficiently manufactured and marketed.

It is a further object of the present invention to provide a new Tool Storage and Transport System which is of a durable and reliable construction.

An even further object of the present invention is to provide a new Tool Storage and Transport System which is susceptible of a low cost of manufacture with regard to both materials and labor, and which accordingly is then susceptible of low prices of sale to the consuming public, thereby making such Tool Storage and Transport System economically available to the buying public.

Still yet another object of the present invention is to provide a new Tool Storage and Transport System which provides in the apparatuses and methods of the prior art some of the advantages thereof, while simultaneously overcoming some of the disadvantages normally associated therewith.

Still another object of the present invention is to provide a new Tool Storage and Transport System for keeping and transporting tools and equipment for use in various locations.

Yet another object of the present invention is to provide a new Tool Storage and Transport System which includes a frame forming a sealed air chamber and interchangeable boxes and bins that mount thereon.

Still yet another object of the present invention is to provide a new Tool Storage and Transport System that eliminates unnecessary trips back and forth to a tool box.

Even still another object of the present invention is to provide a new Tool Storage and Transport System that allows for jobs to be completed on-site rather than having to bring the work into the shop.

Still yet another object of the present invention is to provide a new Tool Storage and Transport System that has heavy duty wheels for use in all types of terrain.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
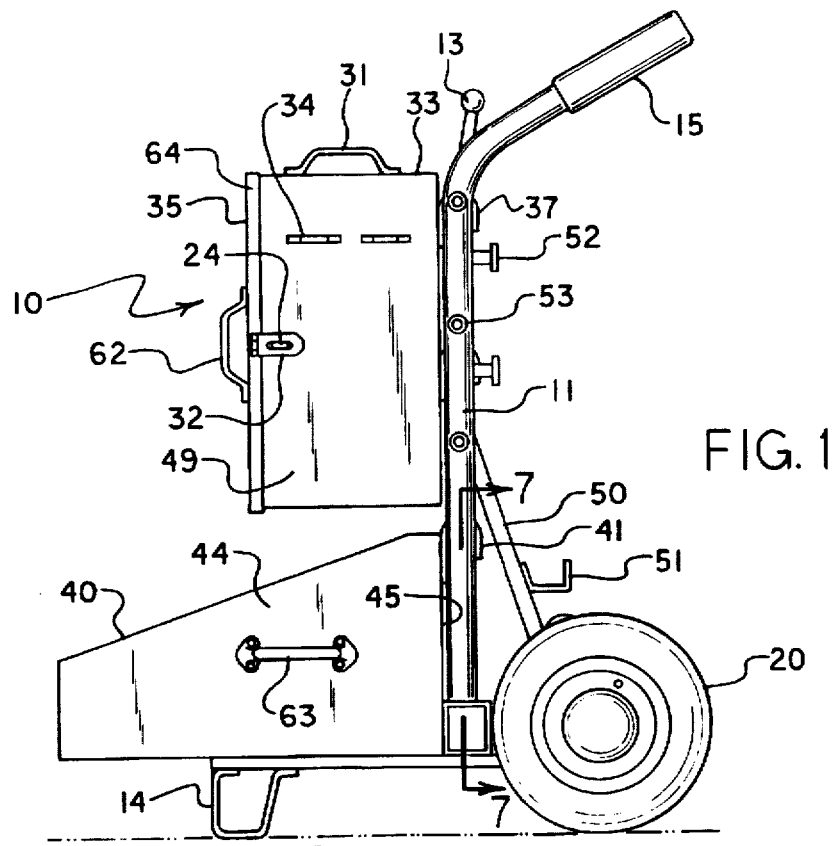
FIG. 1 is a side elevational view of a new Tool Storage and Transport System according to the present invention.

With reference now to the drawings, and in particular to FIGS. 1 through 9 thereof, a new Tool Storage and Transport System embodying the principles and concepts of the present invention and generally designated by the reference numeral 10 will be described.

More specifically, it will be noted that the Tool Storage and sport System 10 comprises a frame 11 including heavy duty wheels and interchangeable boxes 30 and bins 40 that mount upon the frame 11.

With reference to FIG. 1 the Tool Storage and Transport System of the present invention is shown including a frame 11, heavy duty wheels 20 and box 30 and bin 40 mounted thereon. The frame 11 and box 30 and bin 40 are constructed of steel or other suitable material. A handle grip 15 is provided for ease of wheeling the Tool Storage and Transport System. Also shown is a frame supporting means 14 fixedly attached to the frame and adapted to support the frame in an upright position when the Tool Storage and Transport System 10 is not being moved. The frame supporting means 14 is constructed of steel or other suitable material and in the preferred embodiment, includes two section (FIG. 2).

With continued reference to FIG. 1 box 30 includes a top portion 33, a first side portion 49, a second side portion (not shown) and a front cover 35. The top portion 33 is shown including a top handle 31 fixedly attached thereto. Additionally, the front cover 35 is shown including a front handle 62. The front cover 35 is shown having a hasp 32 hingedly attached to a peripheral edge 64. The hasp 32 engages a staple 24 fixedly attached to the first side portion 49 for purposes of locking the box 30. A pair of tool straps 34 are shown fixedly attached to the first side portion 49 for hanging tools and equipment.

With continued reference to FIG. 1 bin 40 is shown including a side portion 44. A bin handle 63 is shown fixedly attached to the side portion 44.

Figure 2:
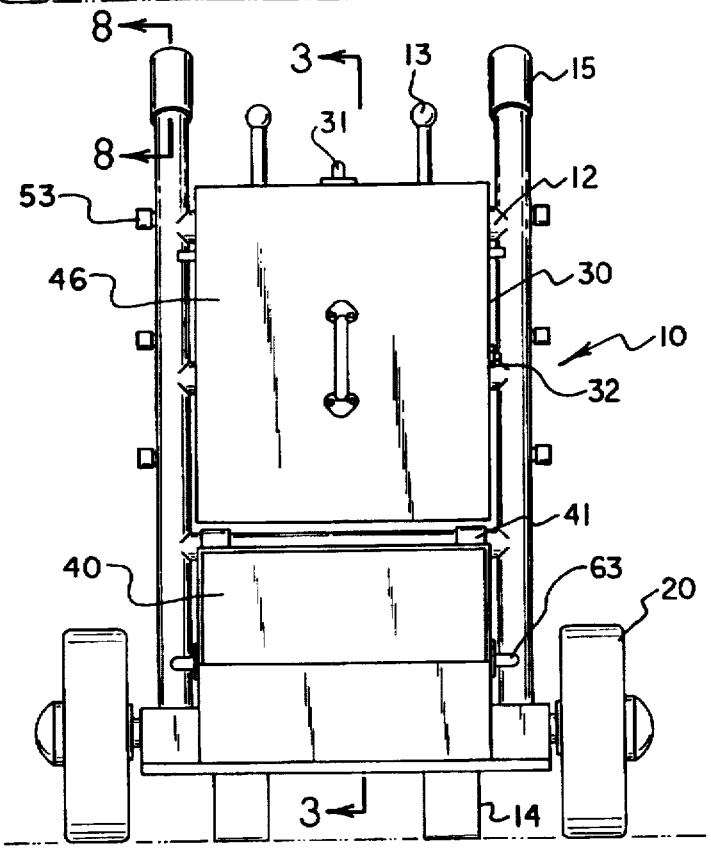
FIG. 2 is a front elevation view thereof.

With reference to FIG. 2 cross bars 12 are positioned on the frame 11 to engageably receive box hangers 37 and bin hangers 41. The box hangers 37 and bin hangers 41 are fixedly attached to the box 30 and bins 40 and spaced apart to engage the cross bars 12 of the frame 11. Hooks 13 are fixedly attached to an uppermost cross bar 12 and serve to hang tools and equipment from. A plurality of female air fittings 53 are shown disposed along the frame 11 and serve to provide pressurized air to tool requiring pressurized air as hereinafter described.

Figure 3:
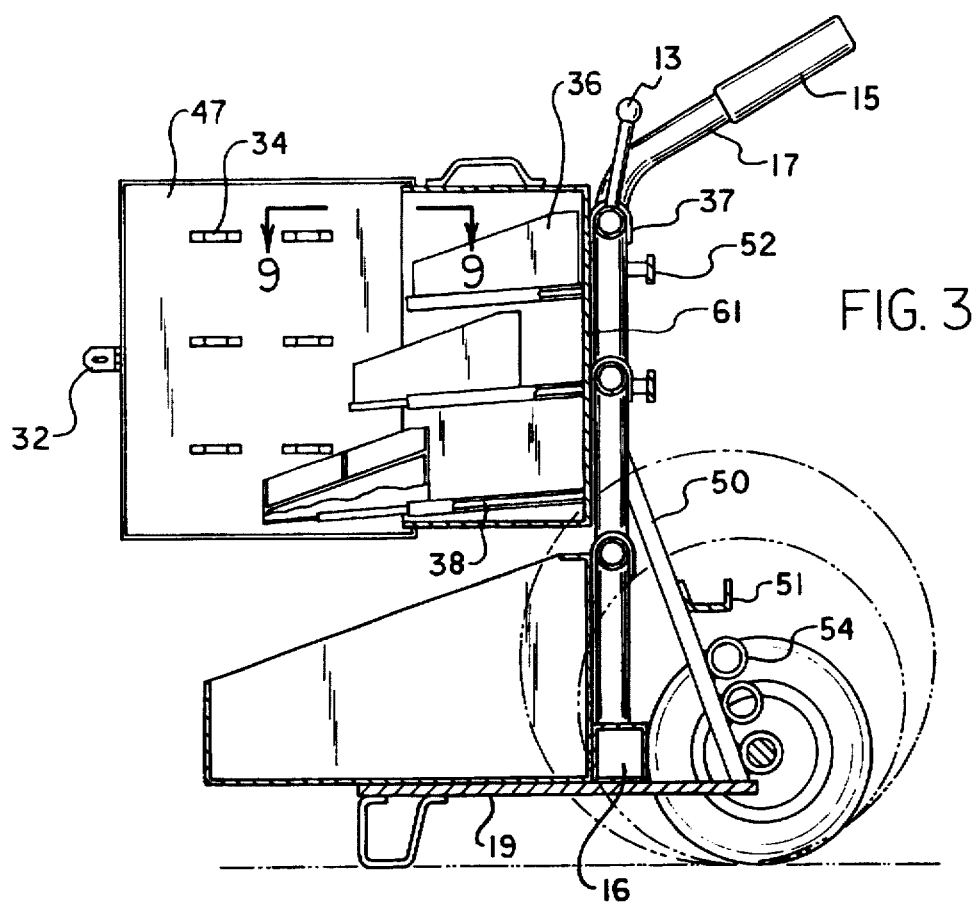
FIG. 3 is a cross sectional view taken along line 3—3 of FIG. 2.

With reference to FIG. 3 the box 30 includes a plurality of shelves 38. The shelves 38 are angled at 100 degrees relative to the back portion 61. Drawers 36 are slidably mounted to the shelves 38 and are stopped from becoming disengaged from the shelves 38 by conventional means.

Figure 5:
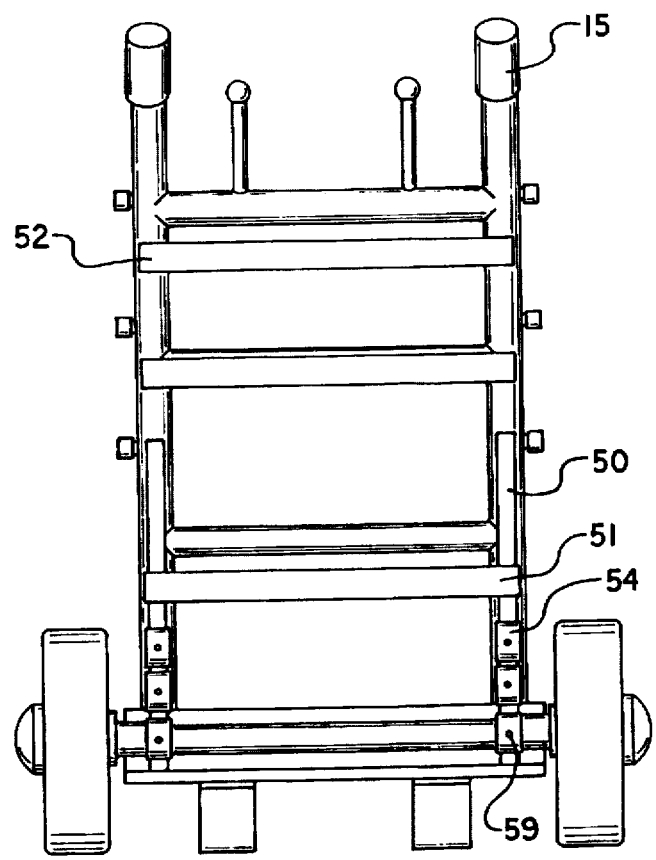
FIG. 5 is a rear view of the new Tool Storage and Transport System according to the present invention.

With continued reference to FIG. 3 the inside surface 47 of the front cover 35 is shown having a plurality of tool straps 34 fixedly attached thereto. Also shown are a pair of tool hangers 52 fixedly attached to the frame 11 for hanging tools (FIG. 5). A sub-frame 50 is shown extending from the frame 1 1 and terminating at a bottom section 19. The sub-frame 50 includes a plurality of axle supporting means 54 for positioning an axle 21 for use with wheels of different dimensions. Also shown is a shelf 51 fixedly attached above the axle supporting means 54 for supporting and carrying tools and equipment.

Figure 4:
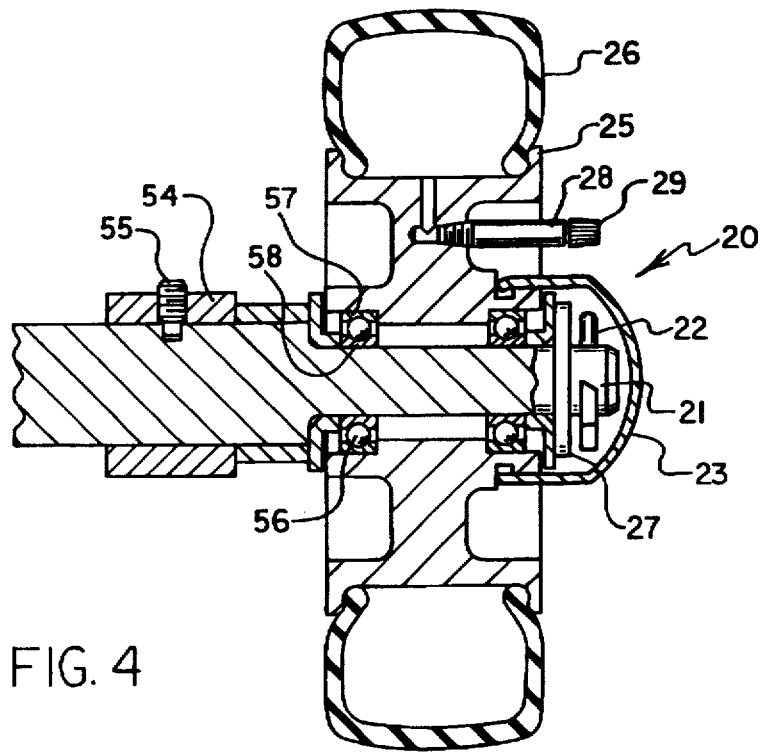
FIG. 4 is a cross sectional view of the wheel assembly of the new Tool Storage and Transport System.

With reference to FIG. 4 the heavy duty wheel assembly 20 includes an axle 21 shown extending through the axle supporting means 54. The axle supporting means 54 is shown consisting of an annular collar having a set screw 55 disposed within a threaded bore 59 for positioning and securing the axle 21 in place. A wheel 25 is shown including an outer race 57, an inner race 56 and a plurality of bearings 56. An inflatable tire 26 is mounted on the wheel 25 and is inflatable by means of valve stem 28 which is capped by cap 29. The wheel 25 is maintained in position by means of a spacer 27 and pin 22. Additionally a hub cap 23 is provided.

Figure 6:
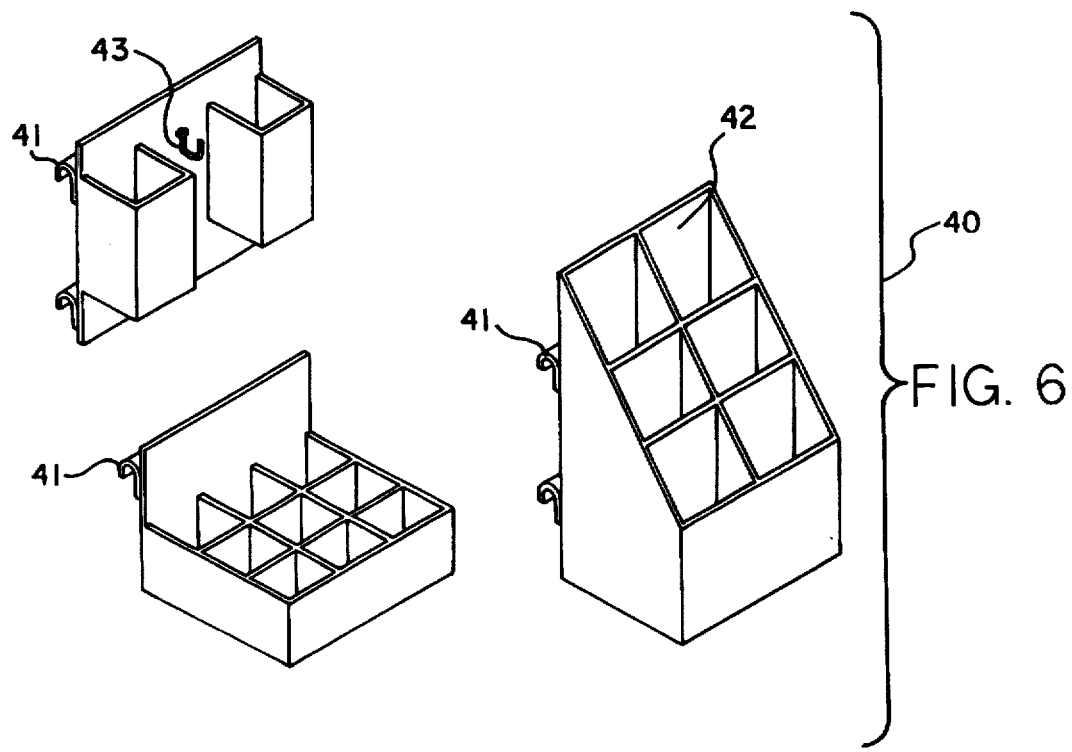
FIG. 6 is a perspective view of several embodiments of the bins according to the present invention.

With reference to FIG. 6 a plurality of bins 40 are shown. Bin compartments 42 can have a plurality of shapes to receive different types of tools and equipment. The bins 40 have an open top side and include bin hangers 41 fixedly attached to a back side 45 and spaced apart for positioning on the frame 11. Also included is a bin hook 43 adapted for receiving tools and equipment.

Figure 7:
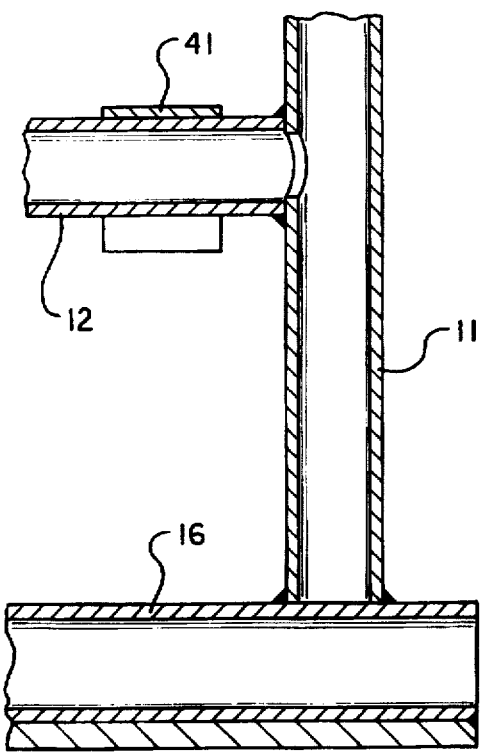
FIG. 7 is a cross sectional view taken along line 7—7 of FIG. 1.

With reference to FIG. 7 there is shown a cross bar 12 welded to the frame 11 in such manner that a sealed air chamber is formed therein for receiving and retaining pressurized air. The bottom cross member 16 is shown isolated from the sealed air chamber.

Figure 8:
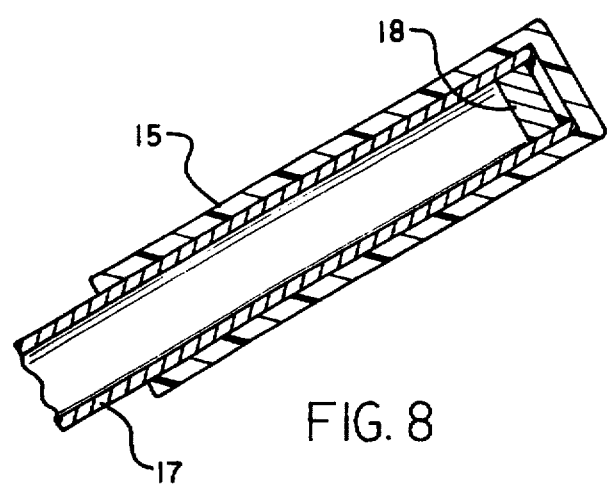
FIG. 8 is a cross sectional view taken along line 8—8 of FIG. 2.

With reference to FIG. 8 there is shown a handle 17 having a plug 18 welded at an end thereof to sealingly contain the pressurized air within the sealed air chamber.

Figure 9:
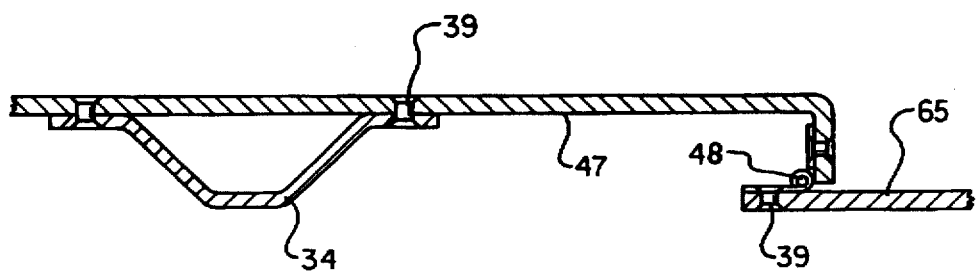
FIG. 9 is a cross sectional view taken along line 9—9 of FIG. 3.

With reference to FIG. 9 there is shown a tool strap riveted to an inside surface 47 by means of rivets 39. A hinge 48 is shown riveted to the second side portion 65 for hingedly attaching the front cover 35 to the second side portion 65.

In use, depending upon the type of tools and equipment needed on a particular job site, different configurations of bins 40 and boxes 30 can be mounted on the Tool Storage and Transport System by simply engaging the box hangers 37 and bin hangers 41 to the cross bars and putting the tools and equipment needed in the boxes and bins. If pressurized air is required, the sealed air chamber is filled with pressurized air and tools can be fitted to air fittings 53.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tool storage and transport system comprising:
   a frame;
   means for carrying tools and equipment;
   means for mounting the means for carrying tools and equipment on the frame;
   wherein the frame further comprises a plurality of hooks, the hooks formed to receive tools and equipment; and
   wherein the frame further comprises a plurality of air fittings disposed thereon.

2. The tool storage and transport system of claim 1, wherein the means for carrying tools and equipment further comprise a box having a top portion, a first and second side portion, a back portion and a front cover.

3. The tool storage and transport system of claim 2, wherein the top portion further comprises a top handle fixedly attached thereto.

4. The tool storage and transport system of claim 2, wherein the front cover further comprises a front handle fixedly attached to an outside surface and a plurality of spaced-apart tool straps fixedly attached to an inside surface.

5. The tool storage and transport system of claim 2, wherein the front cover is hingedly attached to the first side portion.

6. The tool storage and transport system of claim 2, wherein the box further comprises a plurality of drawers disposed therein, the drawers being slidably mountable to a plurality of shelves, the shelves being angled at 100 degrees relative to the back portion.

7. The tool storage and transport system of claim 2, wherein the first and second side portions further comprise a plurality of spaced-apart tool straps fixedly attached thereto.

8. The tool storage and transport system of claim 1, wherein the means for carrying tools and equipment further comprise a bin having an open top side, a back side and a plurality of compartments.

9. The tool storage and transport system of claim 8, wherein the means for mounting the means for carrying tools and equipment further comprise a plurality of hangers fixedly attached to the back side of the bin, said back side of the bin being removably engageable to a plurality of cross bars, the cross bars being fixedly attached to the frame.

10. The tool storage and transport system of claim 9, wherein the frame and cross bars form a chamber for accepting and retaining pressurized air.

11. The tool storage and transport system of claim 1, wherein the frame further comprises a sub-frame, the sub-frame further comprising a plurality of axle supporting means.

12. The tool storage and transport system of claim 11, wherein the sub-frame further comprises a tool shelf fixedly attached thereto.

13. The tool storage and transport system of claim 1, wherein the frame further comprises a pair of heavy-duty wheels having pneumatic tires disposed thereon.

14. The tool storage and transport system of claim 1, wherein the frame further comprises a plurality of tool hangers fixedly attached thereto.

15. The tool storage and transport system of claim 2, wherein the front cover further comprises a hasp hingedly mounted thereto, the hasp being engageable to a staple fixedly attached to the first side portion.

16. A tool storage and transport system comprising:
    a frame;
    means for carrying tools and equipment;
    means for mounting the means for carrying tools and equipment on the frame;
    wherein the frame further comprises a plurality of hooks, the hooks formed to receive tools and equipment; and
    wherein the frame further comprises a plurality of air fittings disposed thereon;
    wherein the means for carrying tools and equipment further comprise a box having a top portion, a first and second side portion, a back portion and a front cover;
    wherein the top portion further comprises a top handle fixedly attached thereto;
    wherein the front cover further comprises a front handle fixedly attached to an outside surface and a plurality of spaced-apart tool straps fixedly attached to an inside surface;
    wherein the front cover is hingedly attached to the first side portion;
    wherein the box further comprises a plurality of drawers disposed therein, the drawers being slidably mountable to a plurality of shelves, the shelves being angled at 100 degrees relative to the back portion;
    wherein the first and second side portions further comprise a plurality of spaced-apart tool straps fixedly attached thereto;
    wherein the means for carrying tools and equipment further comprise a bin having an open top side, a back side and a plurality of compartments;
    wherein the means for mounting the means for carrying tools and equipment further comprise a plurality of hangers fixedly attached to the back side of the bin, the bin being removably engageable to a plurality of cross bars, the cross bars being fixedly attached to the frame;

wherein the frame and cross bars form a chamber for accepting and retaining pressurized air;

wherein the frame further comprises a sub-frame, the sub-frame further comprising a plurality of axle supporting means;

wherein the sub-frame further comprises a tool shelf fixedly attached thereto;

wherein the frame further comprises a pair of heavy-duty wheels having pneumatic tires disposed thereon; and wherein the front cover further comprises a hasp hingedly mounted thereto, the hasp being engageable to a staple fixedly attached to the first side portion.

* * * * *